US009323572B2

(12) United States Patent
DeJana et al.

(10) Patent No.: US 9,323,572 B2
(45) Date of Patent: Apr. 26, 2016

(54) AUTOCONFIGURATION OF A CLOUD INSTANCE BASED ON CONTEXTUAL PARAMETERS

(75) Inventors: Ryan G. DeJana, Longmont, CO (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 13/152,090

(22) Filed: Jun. 2, 2011

(65) Prior Publication Data

US 2012/0311156 A1 Dec. 6, 2012

(51) Int. Cl.
*G06F 9/50* (2006.01)

(52) U.S. Cl.
CPC ........................................ *G06F 9/50* (2013.01)

(58) Field of Classification Search
CPC ........................................................... G06F 9/50
USPC ................. 709/201–203, 217–226, 248–253; 717/177
See application file for complete search history.

(56) References Cited

U.S. PATENT DOCUMENTS

| 6,523,027 | B1 | 2/2003 | Underwood |
| 6,671,705 | B1 | 12/2003 | Duprey et al. |
| 2005/0240558 | A1 | 10/2005 | Gil et al. |
| 2006/0064642 | A1 | 3/2006 | Iyer |
| 2008/0080396 | A1* | 4/2008 | Meijer et al. ................... 370/254 |
| 2010/0169477 | A1 | 7/2010 | Stienhans et al. |
| 2010/0299366 | A1 | 11/2010 | Stienhans et al. |
| 2011/0093522 | A1 | 4/2011 | Chen et al. |
| 2012/0239792 | A1* | 9/2012 | Banerjee et al. ............... 709/223 |

FOREIGN PATENT DOCUMENTS

WO          02077750          10/2002

OTHER PUBLICATIONS

Notification of Transmittal of the International Search Report and the Written Opinion of the International Searching Authority, or the Declaration, PCT Application No. PCT/US2011/040502, dated Aug. 31, 2012.

* cited by examiner

*Primary Examiner* — Andrew Lai
*Assistant Examiner* — Chuong M Nguyen
(74) *Attorney, Agent, or Firm* — Cahn & Samuels, LLP

(57) ABSTRACT

An embodiment of the invention provides a method and system for autoconfiguring a cloud instance based on contextual parameters. More specifically, an interface receives a request for a resource from a user; and, an analysis module connected to the interface examines parameters of the resource. The parameters of the resource include an encryption parameter and a language parameter. The analysis module also examines properties of the request, including a location of the user, at least one rule at the location of the user, and a dominant language at the location of the user. A processor connected to the analysis module determines whether the encryption parameter of the resource violates the rule at the location of the user. An instance generator connected to the processor creates a customized instance of the resource when the encryption parameter of the resource violates the rule at the location of the user.

25 Claims, 10 Drawing Sheets

US 9,323,572 B2

AUTOCONFIGURATION OF A CLOUD INSTANCE BASED ON CONTEXTUAL PARAMETERS

BACKGROUND

The present invention is in the field of systems, methods, and computer program products for autoconfiguring a cloud instance based on contextual parameters.

In the cloud self-service provisioning process, an instance requester can select a resource, such as a server or desktop image, from an image catalog and provision an instance from the catalog in a given data center or network area. Optionally, the instance requester can also provide explicit configuration information with the request in order to determine the behavior of, or other customization required for, the runtime instance, such as middleware passwords and open TCP/IP port configurations.

SUMMARY OF THE INVENTION

An embodiment of the invention provides a method and system for autoconfiguring a cloud instance based on contextual parameters. More specifically, an interface receives a request for a resource from a user; and, an analysis module connected to the interface examines parameters of the resource. The parameters of the resource include an encryption parameter and a language parameter. The analysis module also examines properties of the request, including a location of the user, at least one rule at the location of the user, and a dominant language at the location of the user. A processor connected to the analysis module determines whether the encryption parameter of the resource violates the rule at the location of the user. An instance generator connected to the processor creates a customized instance of the resource when the encryption parameter of the resource violates the rule at the location of the user. This includes modifying the encryption parameter of the resource to comply with the rule at the location of the user, wherein the customized instance of the resource includes the dominant language at the location of the user.

A method and system of another embodiment of the invention includes an interface for receiving a request for a resource from an end user. An analysis module connected to the interface examines properties of the request, wherein the properties of the request include a location of the end user. A resource locator connected to the analysis module identifies locations of data centers having the resource. A processor connected to the resource locator compares the locations of the data centers to the location of the end user and selects a data center for sending the resource to the end user based on the comparing.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
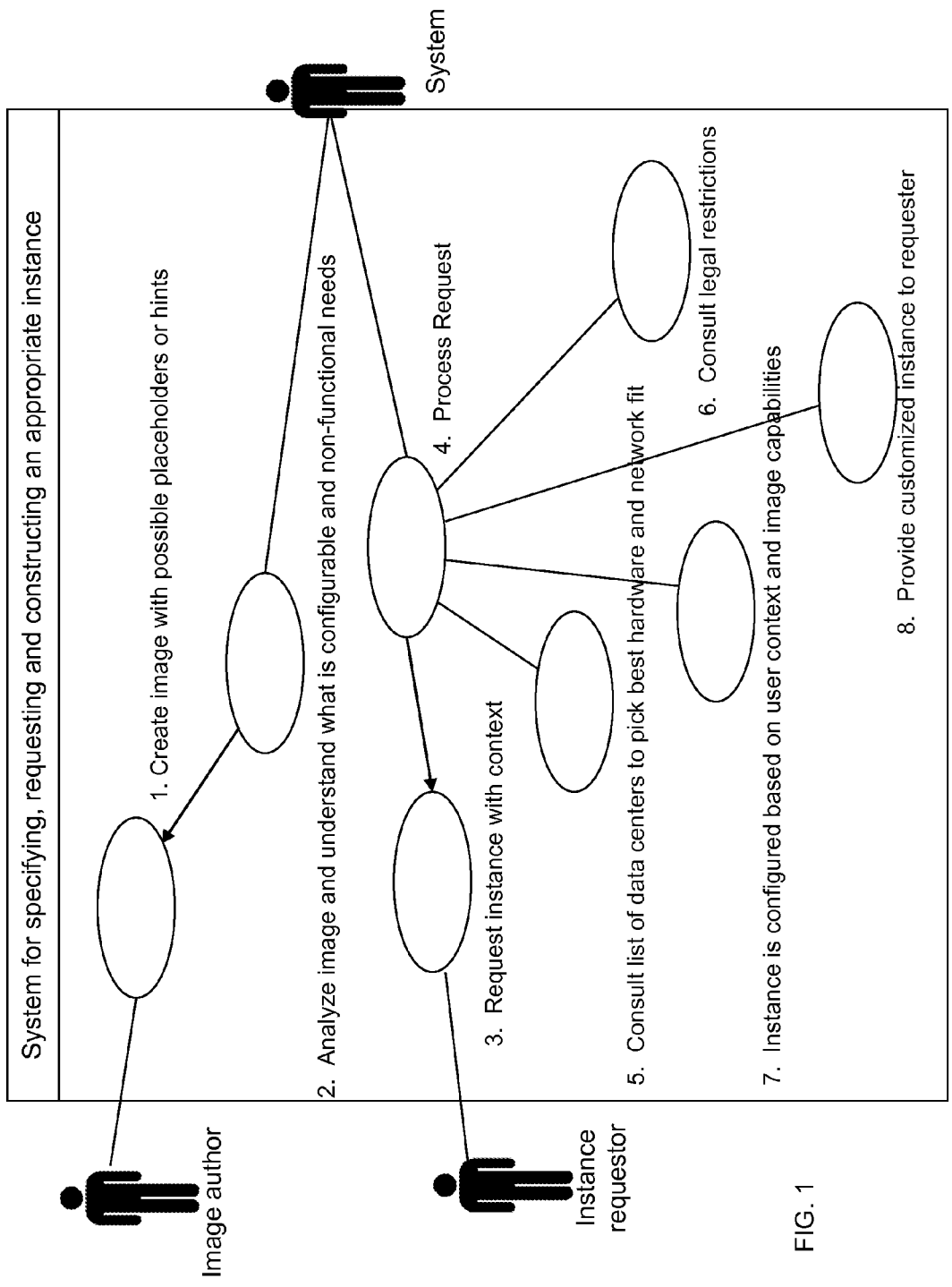
FIG. 1 is a flow diagram illustrating a method for autoconfiguring an instance based on contextual parameters according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides a method for intelligently identifying the ideal parameters (e.g., geography, language, network and law) for a running instance at provision time based on the context of the request and the aspects of the template image that can be configured for the provisioned instance created from it, such as language and cryptographic strength.

In at least one embodiment of the invention, the image (also referred to herein as a "resource") is a copy of the entire state of a computer system stored in a non-volatile form, such as a file. A system is capable of using system images if the system can be shut down and later restored to exactly the same state. Thus, system images can be used for backup. Hibernation of a computer operating system is an example of a system that uses an image of the entire machine's RAM. In at least one embodiment, the system images have configurable properties that can be set between when the operating system is "reconstituted" from its "hibernating" form.

At least one embodiment of the invention provides a system for providing a runtime instance from a master image based on characteristics of the consumer's request for the instance and the context of where that request is made using hints in the master image and by consulting a dynamically changing list of available data centers or applicable international laws. The system provides configuration information automatically based on the context of the request such as geography, locale, or law.

The following provides exemplary implementations of the system according to an embodiment of the invention. In the first example, a German speaker is presenting at a conference in India. He would like to set up a demonstration using an integrated development environment (IDE) on a remote desktop. The speaker has a basic image that he would like to create a running instance from. Instead of spinning up the image in the European data center provider he normally uses, the system determines the closest Cloud provider to his location so that he does not experience any network lag during his demo. This lifts the burden off of the speaker of determining the ideal location for the actual running instance at any given time as he may be travelling to several different conferences on his trip.

In another example, an American speaker is teaching students how to use IBM DB2® database software on a business trip to a South Korean university. There is a master IBM DB2® image that she instructs the students to use for provisioning their own personal instances. The system determines the best local provider for that instance based on the network where the university (or the student's home) is and pre-configures the instance with the Korean language. This frees the instructor from pre-configuring the image for each group of students she speaks with. Moreover, this saves the students who are new to the technology from making unneeded configurations, thereby saving the students time and increasing the likelihood that they will adopt, use, and advocate the technology.

In the next example, a Canadian product manager is providing a demo of IBM WebSphere® application server software and Apache web server software to a customer in Venezuela. He would like to have the potential customer spin up an image of an HTTPS powered Web server pre-configured with Apache. However, there are export restrictions that prevent the level of encryption from being stronger than the normal instance as used in the United States. Rather than concerning himself with the exact encryption laws for each territory he visits, the system consults its master list of current laws. Similarly, the customer is not burdened (or allowed) to change encryption settings to values that would contravene U.S. law.

In another example, an advertisement in an international magazine publishes a barcode that links to a master image. When photographed by a mobile phone, the system creates an instance tailored to that user by choosing the closest data center and pre-configuring the instance with the user's national language (or activates those language packs for ready use and disables those unlikely to be used). This saves the image vendor from having to understand the ultimate destination environment of the running instance, and lets the user get up and running with a smart evaluation based on convention rather than configuration for that particular location.

In each of the foregoing examples, the system saves the image creator time by not having to create custom images for all the possible geographic, linguistic, network, and legal permutations. The system also makes it easier for the end consumer to get the best possible match for their needs based on the context of their provisioning request.

FIG. 1 is a flow diagram illustrating a method for autoconfiguring an instance based on contextual parameters according to an embodiment of the invention. An image creator develops an image and intentionally or unintentionally provides configuration hints, characteristics and non-functional requirements (also referred to herein as "parameters") 1. Examples of image parameters include whether the image is graphics intensive, requires a lot of memory, CPU, and/or disk, and whether the image includes sensitive encryption packages and/or language packs. In at least one embodiment, the parameters are obtained from image metadata.

A system introspects the image for its configurable parameters and preferred operating environment 2, e.g., whether the image has language or geographic configurability and what those options are. Based on the nature of the image, the system determines whether it is one that would benefit from fast network connectivity, high CPU or memory requirements, or has sensitive export controls.

An end user requests a running instance from the given image 3; and, the system accepts and processes the request 4. With the master image and what the system knows about it from introspection, the system uses the parameters at instance creation time based on the context of the requestor to create a dynamically configured instance tailored to the end user. In at least one embodiment, the context of the requestor (also referred to herein as "properties") is obtained from metadata.

The user's location or future location is determined; and, the system automatically associates a data center 5. The user's location is determined by GPS location (of the requesting device), cell phone triangulation techniques, HTML5 geo location, the user's current IP address, the user's calendar entries, GPS route/future planned destinations, and/or the user's location is manually entered by the user. The system consults a list of possible data centers and their metadata and chooses a data center based on what is the best fit for the characteristics of the image and the context of the requester. For instance, the system may choose a close geographical data center with fast network connectivity or a data center farther away that has more CPU capacity, memory, storage, and/or availability.

The system consults a list of legal restrictions for the requester's context and the capabilities in the image 6, such as encryption. The instance is configured based on language preference and geographical information provided by the instance request 7. The system uses this to configure language packs and maximum crypto strength. The instance is available for instance requester use 8.

Figure 2:
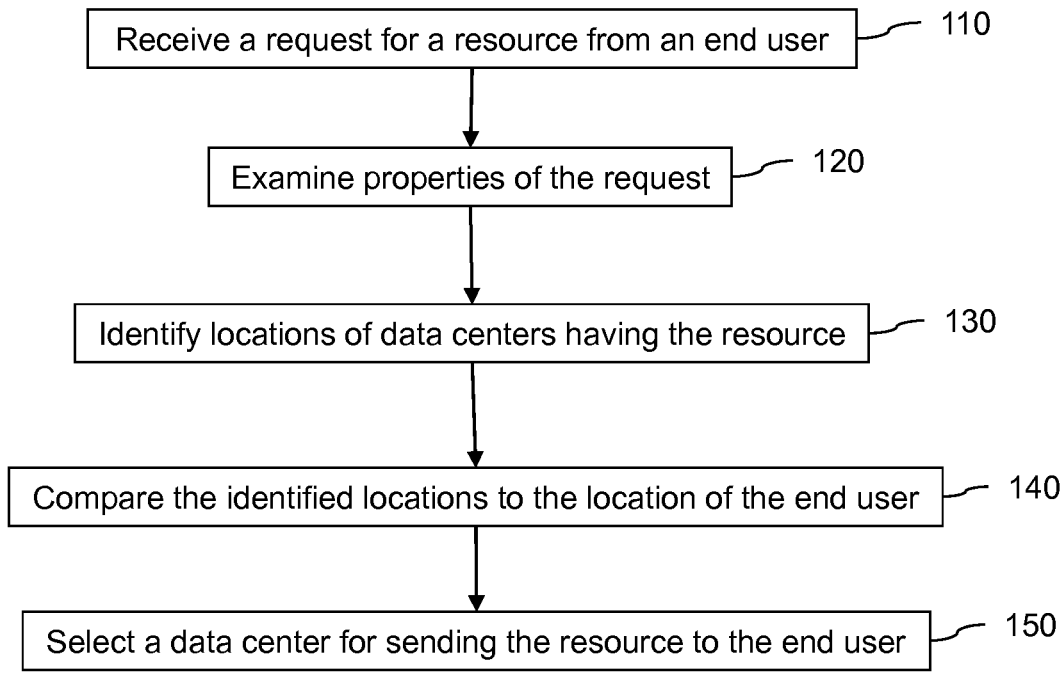
FIG. 2 is a flow diagram illustrating a method for selecting a data center according to an embodiment of the invention.

FIG. 2 is a flow diagram illustrating a method for selecting a data center according to an embodiment of the invention. A request for a resource (also referred to herein as the "master image" or "template image") is received from an end user via an interface 110; and, the properties of the request are examined with a processor 120.

In at least one embodiment, the properties of the request include the location of the end user, such as the area code, zip code, city and state, and/or GPS coordinates that the request was sent from. In another embodiment, the properties of the request further include rule(s) at the location of the end user and/or the data center sending the resource, e.g., maximum encryption strength for an image requested from or to be transmitted to Washington, D.C. As used herein, the term "rules" include laws, regulations, and/or policies. In yet another embodiment, the properties of the request include the dominant language spoken at the location of the end user. Thus, a request for a resource received from Chicago, Ill. has the "English" property; and, a request for a resource received from Munich, Germany includes the "German" property. In another embodiment of the invention, the properties of the request include the graphics capability of the computer that the request was sent from. For example, a property of the request indicates whether the requesting computer is capable of displaying 1080i graphics.

Locations of data centers having the resource are identified 130 with the processor; and, the identified locations are compared to the location of the end user with a comparison module 140. A data center for sending the resource to the end user is selected with a selection module 150, wherein the data center is selected based on the comparison performed by the comparison module 140. In the example above, data centers within a 100 mile radius of Washington, D.C. are identified that have the requested resource. The data center that is closest to Washington, D.C. is selected for sending the resource to the end user. In at least one embodiment, the processor includes the comparison module and the selection module.

Another embodiment of the invention also identifies properties of the data centers, such as CPU capacity, memory capacity, storage capacity, and scheduling availability. Thus, the data center is selected based on the locations and the properties of the data centers.

In at least one embodiment, the locations and the properties of the data centers are weighted factors that are used to select the data center for sending the resource to the end user. The weights assigned to each factor can be established by the user and/or an administrator of the system. For example, one embodiment of the invention weighs the location, CPU capacity, and memory capacity equally (i.e., 33% weight for each metric). Another embodiment of the invention allocates 50% weight to location, 30% weight to CPU capacity, and 20% weight to memory capacity. In at least one embodiment, an algorithm is utilized to select the data center, wherein the "weights" are coefficients and the factors are scaled metrics (e.g., 1-10 rating). For example, a datacenter that is in the same zip code as the user's location has a high location metric (e.g., 10 rating); and, a data center having low CPU capacity has a low CPU capacity metric (e.g., 3 rating).

In at least one embodiment of the invention, parameters of the resource are examined, wherein the parameters include an encryption parameter indicating the level of encryption of the resource, a language parameter indicating the textual language in the resource, and/or a graphics parameter identifying whether the resource is graphics intensive, requires a lot of memory, CPU, and/or disk.

At least one embodiment of the invention determines whether the encryption parameter of the resource violates a rule at the location of the end user. A customized instance of the resource is created when the encryption parameter of the resource violates the rule at the location of the end user. The customized instance is created by modifying the encryption parameter of the resource to comply with the rule at the location of the end user (e.g., lowering the encryption level to comply with the local rule).

In another embodiment, the customized instance of the resource is created by modifying the language parameter of the resource when the language parameter does not match the dominant language at the location of the end user. For example, when a template image is in French, an auto-translation module of the instance generator creates a customized instance of an image in Japanese for requesters in Tokyo, Japan. In yet another embodiment, the customized instance of the resource is created by modifying the graphics parameter of the resource when the graphics parameter is incompatible with the graphics capability of the requesting computer (e.g., lowering the image quality to comply with the graphics capabilities)

Figure 3:
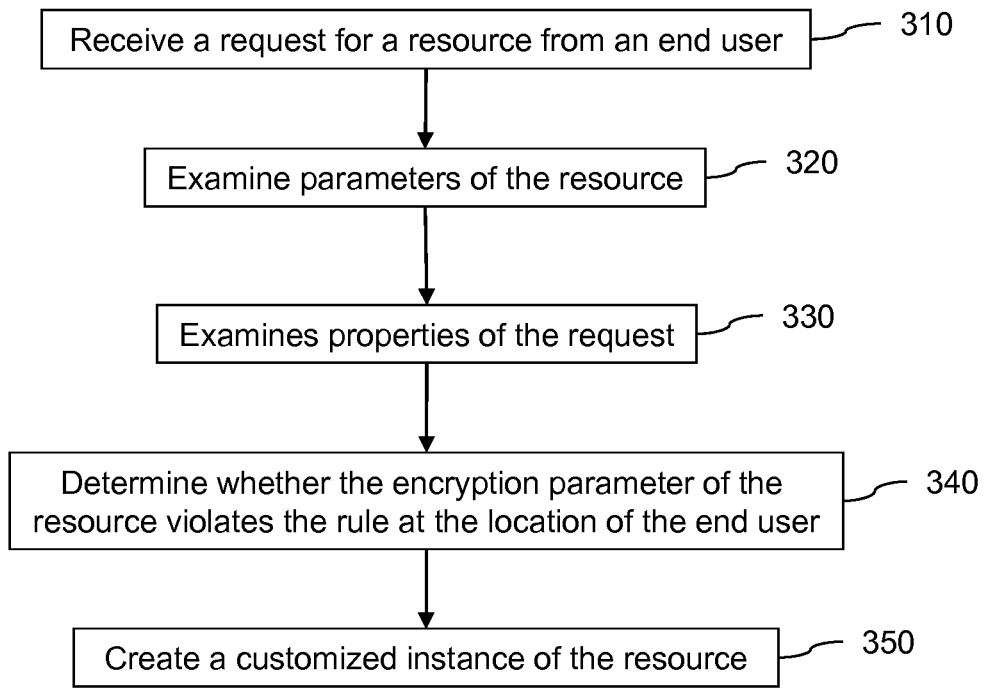
FIG. 3 is a flow diagram illustrating a method for autoconfiguring an instance based on contextual parameters according to an embodiment of the invention.
Figure 4:
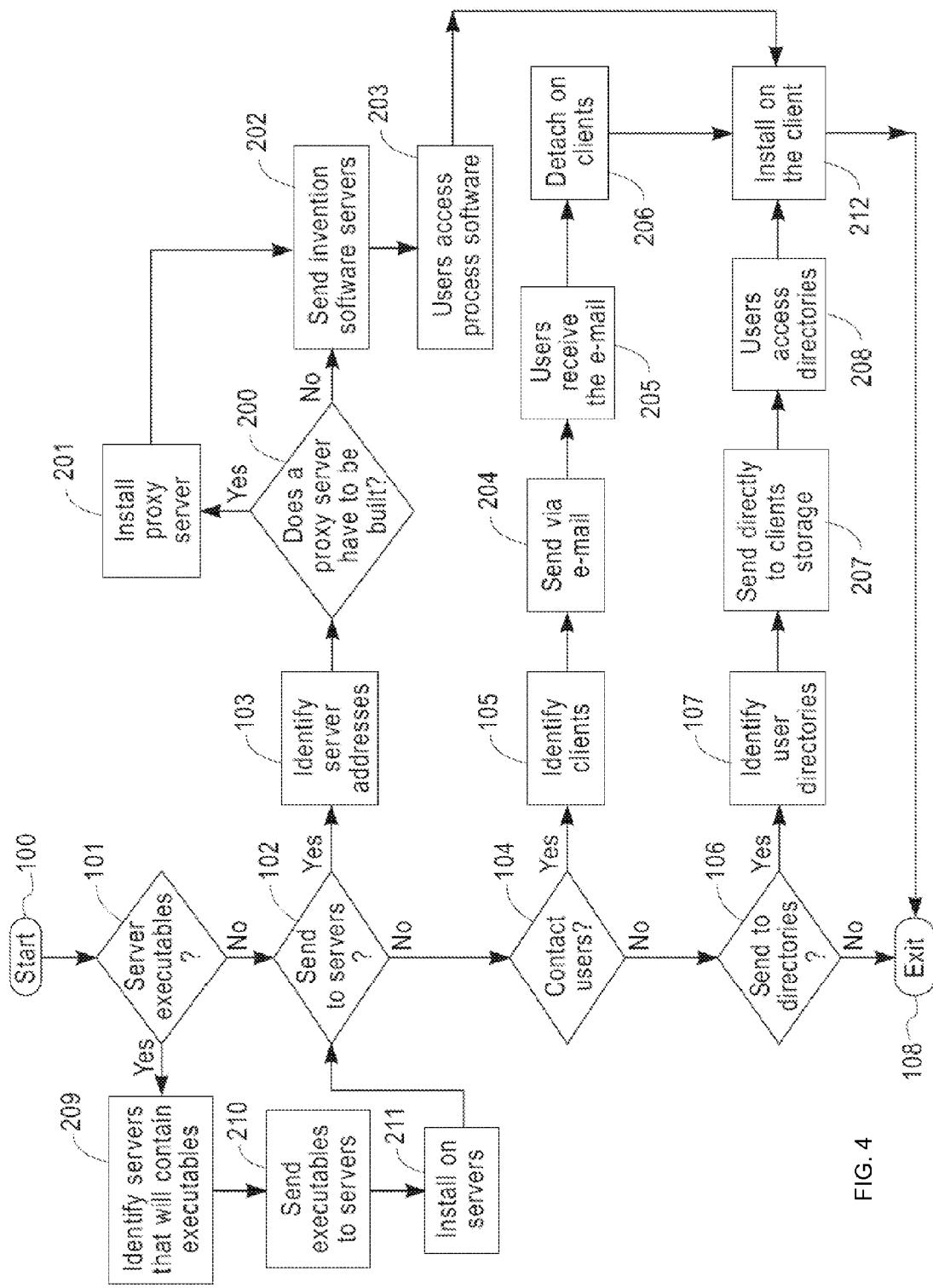
FIG. 4 is a flow diagram illustrating a system and method for deployment according to an embodiment of the invention.
Figure 5:
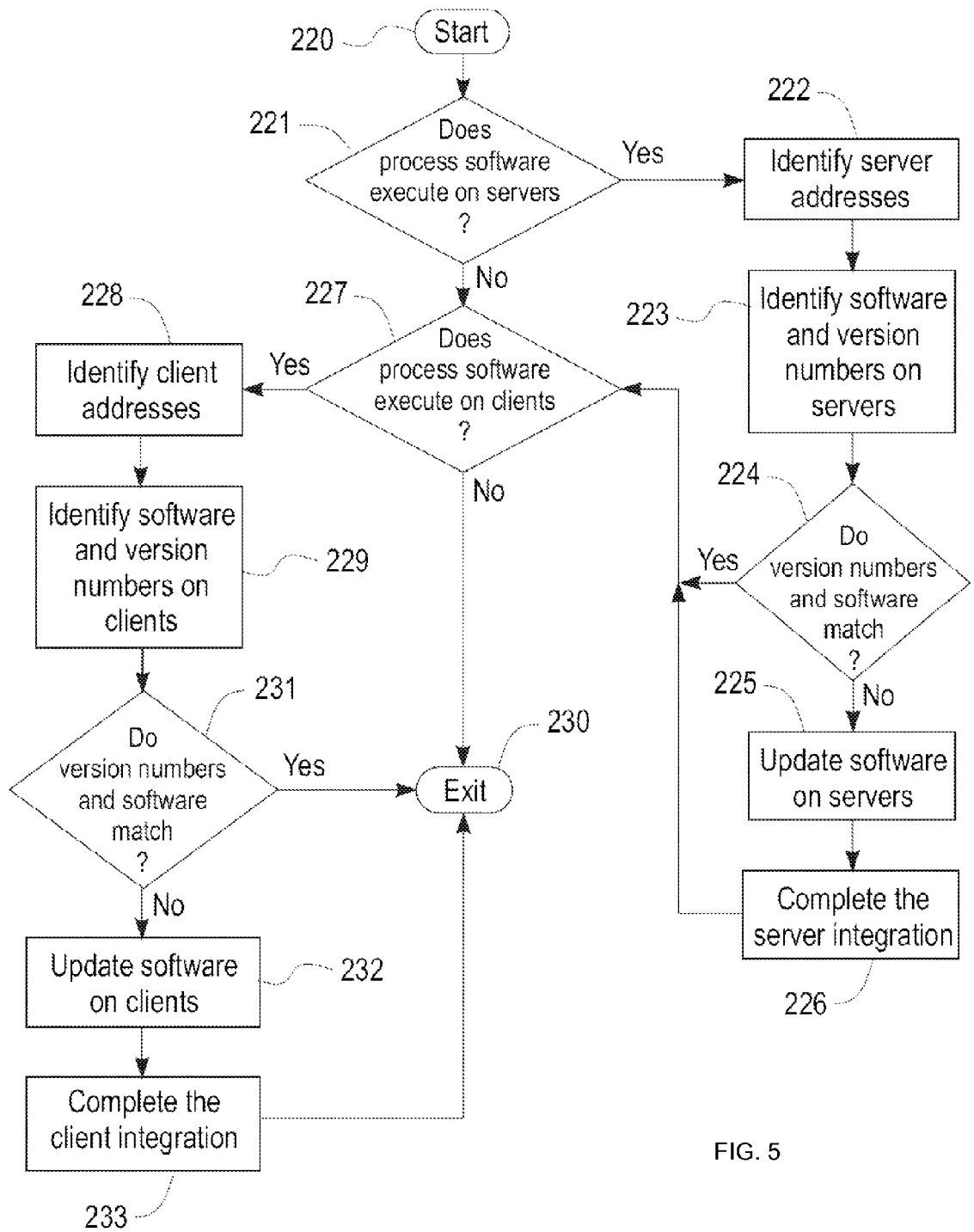
FIG. 5 is a flow diagram illustrating a system and method for integration according to an embodiment of the invention.
Figure 6:
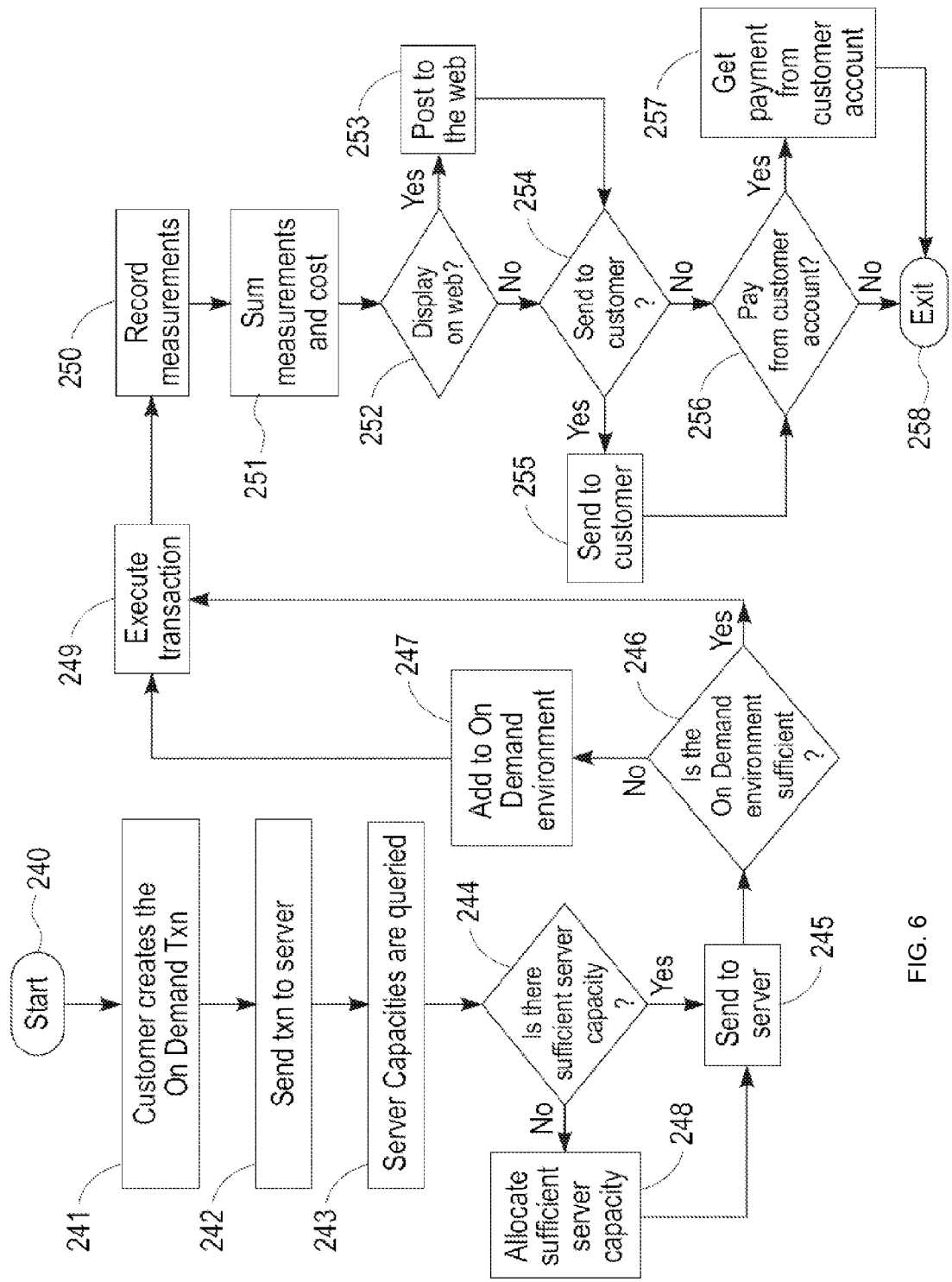
FIG. 6 is a flow diagram illustrating a system and method for on demand according to an embodiment of the invention.
Figure 7:
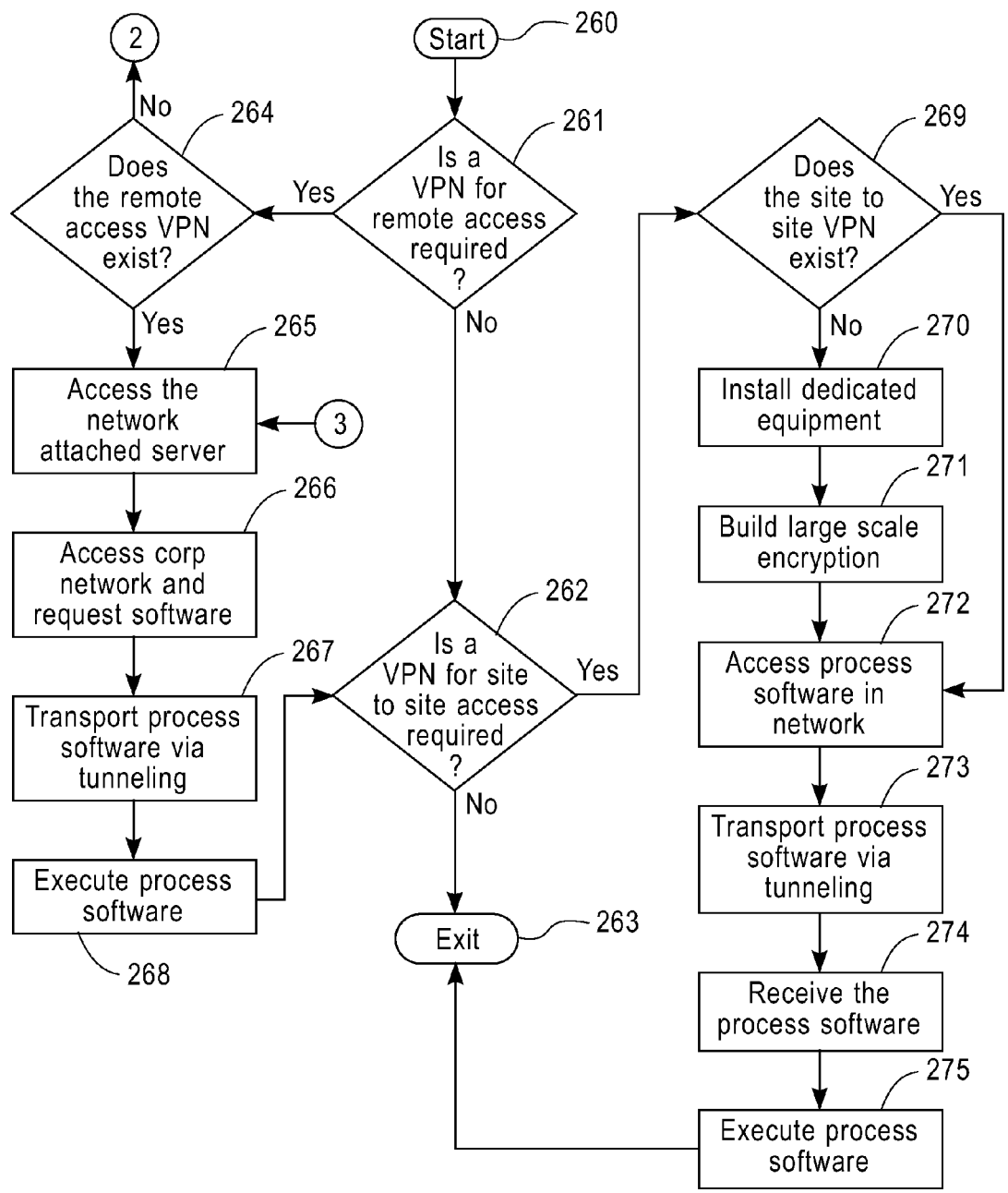
FIG. 7 is a flow diagram illustrating a system and method for a virtual private network according to an embodiment of the invention.

FIG. 3 is a flow diagram illustrating a method for autoconfiguring an instance based on contextual parameters according to an embodiment of the invention. A request for a resource is received from an end user via an interface 310; and, parameters of the resource are examined 320 with a processor. In at least one embodiment, the parameters of the resource include an encryption parameter indicating the level of encryption of the resource, a language parameter indicating the textual language in the resource, and/or a graphics parameter identifying whether the resource is graphics intensive, requires a lot of memory, CPU, and/or disk. The processor also examines properties of the request 330, wherein the properties include the location of the end user, rule(s) at the location of the end user, the dominant language spoken at the location of the end user, and/or the graphics capability of the computer that the request was sent from.

A decision engine determines whether the encryption parameter of the resource violates the rule at the location of the end user 340. When the encryption parameter of the resource violates the rule at the location of the end user, a virtual machine factory (also referred to herein as an "instance generator") creates a customized instance of the resource 350 by modifying the encryption parameter of the resource to comply with the rule at the location of the end user. The processor includes or is connected to the decision engine and/or the virtual machine factory. As used herein, the term "connected" includes operationally connected, logically connected, in communication with, physically connected, engaged, coupled, contacts, linked, affixed, and attached.

In at least one embodiment, the decision engine determines whether the encryption parameter of the resource violates a rule at a location of the data center including the resource (e.g., the data center sending the customized instance of the resource or an instance of the resource to be modified). Thus, the virtual machine factory modifies the encryption parameter of the resource to comply with the rule at the location of the data center when the encryption parameter of the resource violates the rule at the location of the data center.

In at least one embodiment of the invention, the customized instance of the resource is created by modifying the language parameter of the resource when the language parameter does not match the dominant language at the location of the end user. In another embodiment, the customized instance of the resource is created by modifying the graphics parameter of the resource when the graphics parameter is incompatible with the graphics capability.

While it is understood that the process software (e.g., the input extraction system, the virtual machine provisioning system, and the business rules engine) may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server and then it will be stored on the proxy server.

Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211. Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via email to each of the users' client computers. The users then receive the e-mail 205 and then detach the process software from the e-mail to a directory on their client computers 206. The user executes the program that installs the process software on his client computer 212 then exits the process 108.

Lastly a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software (e.g., the input extraction system, the virtual machine provisioning system, and the business rules engine) is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers that have been tested with the process software 229. The clients are also checked to determine if there is any missing software that is required by the process software 229.

A determination is made is the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software (e.g., the input extraction system, the virtual machine provisioning system, and the business rules engine) is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements f use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 240 begins the On Demand process. A transaction is created than contains the unique customer identification, the requested service type and any service parameters that further specify the type of service 241. The transaction is then sent to the main server 242. In an On Demand environment the main server can initially be the only server, and then as capacity is consumed other servers are added to the On Demand environment.

The server central processing unit (CPU) capacities in the On Demand environment are queried 243. The CPU requirement of the transaction is estimated, then the server's available CPU capacity in the On Demand environment is compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next the required software to process the transaction is accessed, loaded into memory, and then the transaction is executed 249.

The usage measurements are recorded 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 251.

If the customer has requested that the On Demand costs be posted to a web site 252 then they are posted 253. If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process.

The process software (e.g., the input extraction system, the virtual machine provisioning system, and the business rules engine) may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Step 260 begins the Virtual Private Network (VPN) process. A determination is made to see if a VPN for remote access is required 261. If it is not required, then proceed to 262. If it is required, then determine if the remote access VPN exists 264.

If it does exist, then proceed to 265. Otherwise identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is, the process software is divided into packets and each packet including the data and protocol is placed within another packet 267. When the process software arrives at the remote user's desktop, it is removed from the packets, reconstituted and then is executed on the remote user's desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it had been previously established, the users access the process software via the VPN 272. The process software is transported to the site users over the network via tunneling. That is, the process software is divided into packets and each packet including the data and protocol is placed within another packet 274. When the process software arrives at the remote user's desktop, it is removed from the packets, reconstituted and is executed on the site user's desktop 275. Proceed to exit the process 263.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 8:
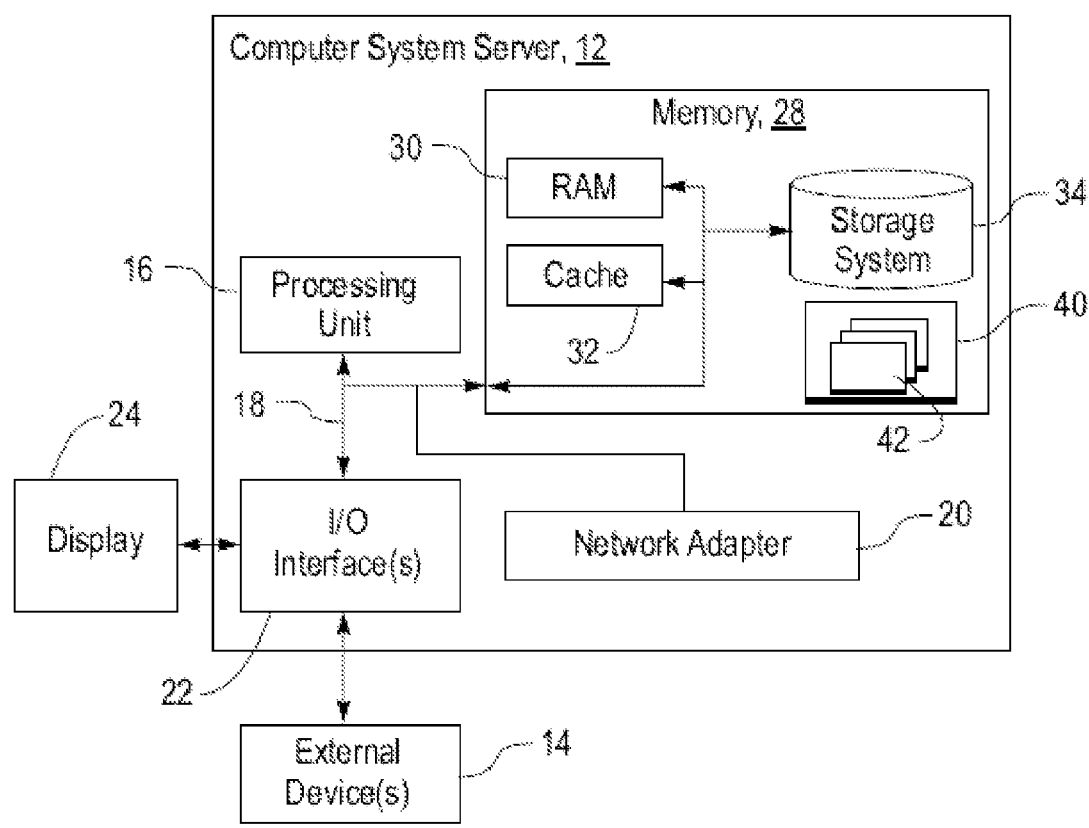
FIG. 8 depicts a cloud computing node according to an embodiment of the invention.

Referring now to FIG. 8, a schematic of an example of a cloud computing node is shown.

Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer systemexecutable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
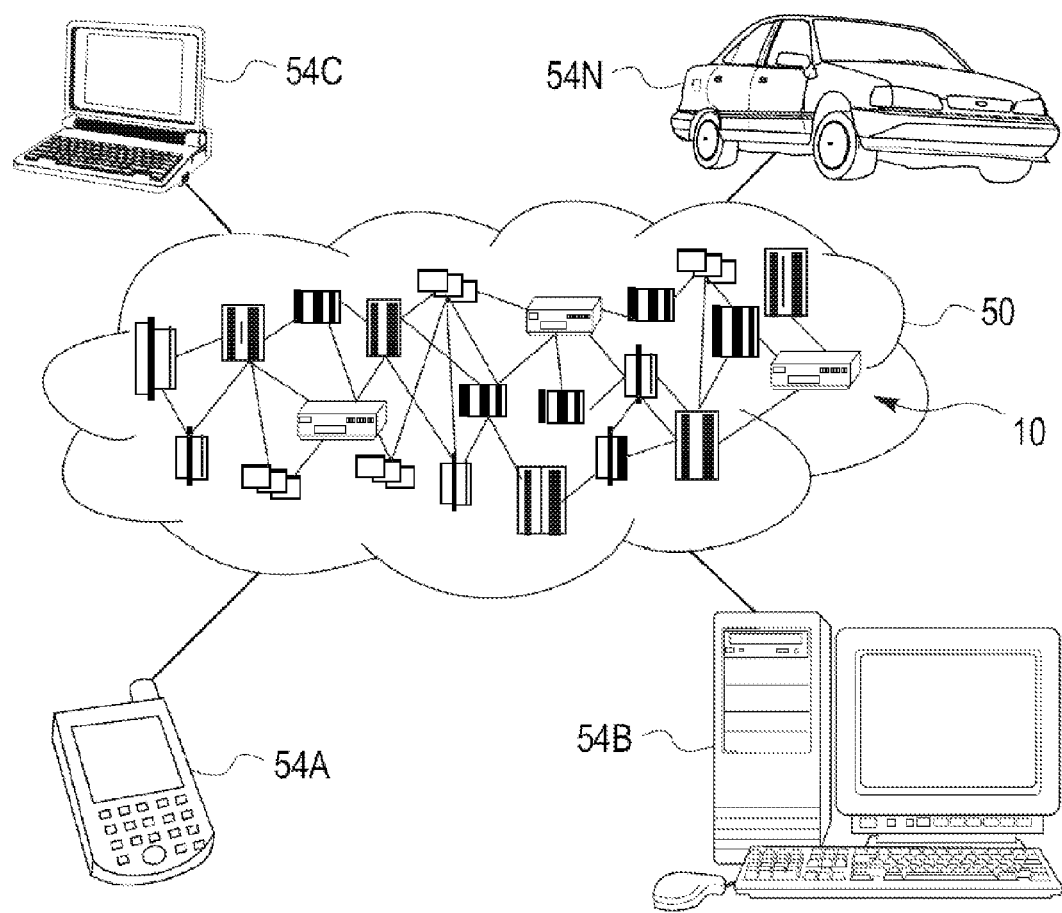
FIG. 9 depicts a cloud computing environment according to an embodiment of the invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
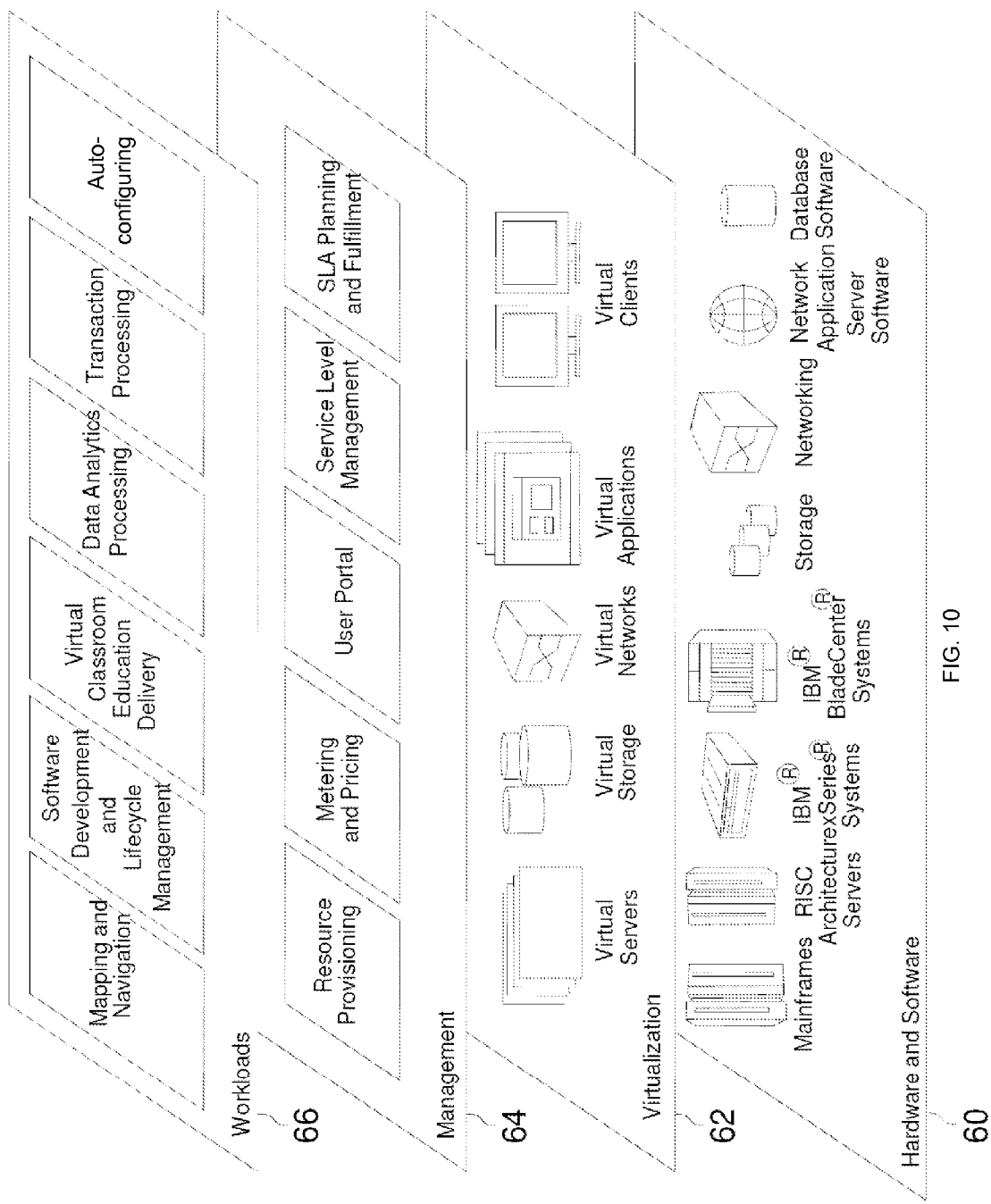
FIG. 10 depicts abstraction model layers according to an embodiment of the invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and autoconfiguring of a cloud instance.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
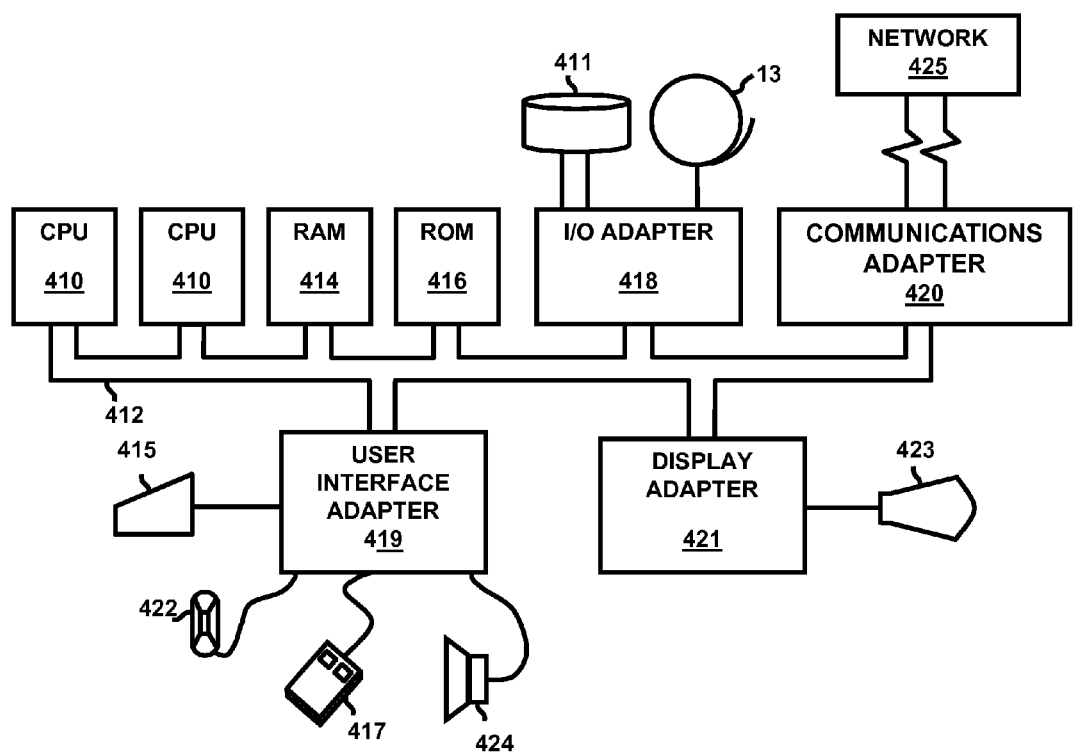
FIG. 11 illustrates a computer program product according to an embodiment of the invention.

Referring now to FIG. 11, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 410. The CPUs 410 are interconnected with system bus 412 to various devices such as a random access memory (RAM) 414, read-only memory (ROM) 416, and an input/output (I/O) adapter 418. The I/O adapter 418 can connect to peripheral devices, such as disk units 411 and tape drives 413, or other program storage devices that are readable by the system. The system can read the inventive instructions on the program storage devices and follow these instructions to execute the methodology of at least one embodiment of the invention. The system further includes a user interface adapter 419 that connects a keyboard 415, mouse 417, speaker 424, microphone 422, and/or other user interface devices such as a touch screen device (not shown) to the bus 412 to gather user input. Additionally, a communication adapter 420 connects the bus 412 to a data processing network 425, and a display adapter 421 connects the bus 412 to a display device 423 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving a request for a resource from an end user;
examining properties of the request, the properties of the request including a location of the end user;
identifying locations of data centers having the resource;
comparing the locations of the data centers to the location of the end user with a processor;
selecting a data center with the processor for sending the resource to the end user, the data center being selected based on said comparing; and
creating a customized instance of the resource when an encryption parameter of the resource violates a rule at the location of the end user by modifying the encryption parameter of the resource to comply with the rule at the location of the end user.

2. The method according to claim 1, further comprising identifying properties of the data centers, wherein said selecting of the data center is further based on the properties of the data centers.

3. The method according to claim 2, wherein the properties of the data centers comprise CPU capacity, memory capacity, storage capacity, and scheduling availability.

4. The method according to claim 1, further comprising:
examining parameters of the resource, the parameters of the resource including the encryption parameter, wherein the properties of the request further includes the rule at the location of the end user; and
determining whether the encryption parameter of the resource violates the rule at the location of the end user.

5. The method according to claim 4, wherein the parameters of the resource further comprise a language parameter,
wherein the properties of the request further comprise a dominant language at the location of the end user, and
wherein said creating of the customized instance of the resource including modifying the language parameter of the resource when the language parameter does not match the dominant language at the location of the end user.

6. The method according to claim 4, wherein the parameters of the resource further comprise a graphics parameter,
wherein the properties of the request further comprise a graphics capability, and
wherein said creating of the customized instance of the resource comprises modifying the graphics parameter of the resource when the graphics parameter is incompatible with the graphics capability.

7. The method according to claim 1, wherein the location of the end user comprises at least one of a present location of the end user and a future location of the end user.

8. A method comprising:
receiving a request for a resource from an end user;

examining parameters of the resource, the parameters of the resource including an encryption parameter;

examining properties of the request, the properties of the request including a location of the end user and at least one rule at the location of the end user;

determining whether the encryption parameter of the resource violates the rule at the location of the end user with a decision engine; and creating a customized instance of the resource when the encryption parameter of the resource violates the rule at the location of the end user with an instance generator, said creating of the customized instance of the resource including modifying the encryption parameter of the resource to comply with the rule at the location of the end user.

9. The method according to claim 8, wherein the parameters of the resource further comprise a language parameter, wherein the properties of the request further comprise a dominant language at the location of the end user, and wherein said creating of the customized instance of the resource including modifying the language parameter of the resource when the language parameter does not match the dominant language at the location of the end user.

10. The method according to claim 8, wherein the parameters of the resource further comprise a graphics parameter, wherein the properties of the request further comprise a graphics capability, and wherein said creating of the customized instance of the resource comprises modifying the graphics parameter of the resource when the graphics parameter is incompatible with the graphics capability.

11. The method according to claim 8, further comprising:

identifying locations of data centers having the resource;

comparing the locations of the data centers to the location of the end user, wherein the location of the end user comprises at least one of a present location of the end user and a future location of the end user; and selecting a data center for sending the resource to the end user based on said comparing.

12. The method according to claim 8, further comprising:

determining whether the encryption parameter of the resource violates a rule at a location of a data center including the resource, wherein said creating of the customized instance of the resource includes modifying the encryption parameter of the resource to comply with the rule at the location of the data center.

13. A method comprising:

receiving a request for a resource from a user;

examining parameters of the resource, the parameters of the resource including an encryption parameter and a language parameter;

examining properties of the request, the properties of the request including a location of the user, at least one rule at the location of the user, and a dominant language at the location of the user;

determining whether the encryption parameter of the resource violates the rule at the location of the user; and creating a customized instance of the resource when the encryption parameter of the resource violates the rule at the location of the user with a instance generator, said creating of the customized instance of the resource including modifying the encryption parameter of the resource to comply with the rule at the location of the user, the customized instance of the resource including the dominant language at the location of the user.

14. The method according to claim 13, wherein the parameters of the resource further comprise a graphics parameter, wherein the properties of the request further comprise a graphics capability, and wherein said creating of the customized instance of the resource comprises modifying the graphics parameter of the resource when the graphics parameter is incompatible with the graphics capability.

15. The method according to claim 13, further comprising:

identifying locations of data centers having the resource;

comparing the locations of the data centers to the location of the user, wherein the location of the end user comprises at least one of a present location of the end user and a future location of the end user; and selecting a data center for sending the resource to the user based on said comparing.

16. The method according to claim 13, further comprising:

determining whether the encryption parameter of the resource violates a rule at a location of a data center including the resource, wherein said creating of the customized instance of the resource includes modifying the encryption parameter of the resource to comply with the rule at the location of the data center.

17. A system comprising:

an interface for receiving a request for a resource from an end user;

an analysis module connected to said interface, said analysis module examines properties of the request, the properties of the request including a location of the end user;

a resource locator connected to said analysis module, said resource locator identifies locations of data centers having the resource;

a processor connected to said resource locator, said processor compares the locations of the data centers to the location of the end user and selects a data center for sending the resource to the end user based on the locations of the data centers; and an instance generator connected to said processor, said instance generator creates a customized instance of the resource when an encryption parameter of the resource violates a rule at the location of the end user by modifying the encryption parameter of the resource to comply with the rule at the location of the end user.

18. The system according to claim 17, wherein said resource locator identifies properties of the data centers, wherein said processor selects the data center based on the properties of the data centers, and wherein the properties of the data centers comprise CPU capacity, memory capacity, storage capacity, and scheduling availability.

19. The system according to claim 17, wherein said analysis module examines parameters of the resource, wherein the parameters of the resource include the encryption parameter, wherein the properties of the request include the rule at the location of the end user, wherein said processor determines whether the encryption parameter of the resource violates the rule at the location of the end user.

20. The system according to claim 19, wherein the parameters of the resource further comprise a language parameter, wherein the properties of the request further comprise a dominant language at the location of the end user, and wherein said instance generator modifies the language parameter of the resource when the language parameter does not match the dominant language at the location of the end user.

21. The system according to claim 19, wherein the parameters of the resource further comprise a graphics parameter, wherein the properties of the request further comprise a graphics capability, and wherein said instance generator modifies the graphics parameter of the resource when the graphics parameter is incompatible with the graphics capability.

22. A system comprising:
   an interface for receiving a request for a resource from a user;
   an analysis module connected to said interface, said analysis module examines:
      parameters of the resource including an encryption parameter and a language parameter, and
      properties of the request including a location of the user, at least one rule at the location of the user, and a dominant language at the location of the user;
   a processor connected to said analysis module, said processor determines whether the encryption parameter of the resource violates the rule at the location of the user; and
   an instance generator connected to said processor, said instance generator creates a customized instance of the resource when the encryption parameter of the resource violates the rule at the location of the user, said instance generator modifies the encryption parameter of the resource to comply with the rule at the location of the user, the customized instance of the resource including the dominant language at the location of the user.

23. The system according to claim 22, wherein the parameters of the resource further comprise a graphics parameter, wherein the properties of the request further comprise a graphics capability, and wherein said instance generator modifies the graphics parameter of the resource when the graphics parameter is incompatible with the graphics capability.

24. The system according to claim 22, further comprising a resource locator connected to said analysis module, said resource locator identifies locations of data centers having the resource,
   wherein said processor compares the locations of the data centers to the location of the user and selects a data center for sending the resource to the user based on the locations of the data centers.

25. The system according to claim 24, wherein the location of the end user comprises at least one of a present location of the end user and a future location of the end user.

* * * * *